United States Patent
Fan et al.

(10) Patent No.: US 10,703,918 B2
(45) Date of Patent: Jul. 7, 2020

(54) COATING ADDITIVE

(71) Applicants: Dow Global Technologies LLC, Midland, MI (US); Rohm and Haas Company, Collegeville, PA (US)

(72) Inventors: Liqiang Fan, Shanghai (CN); Rui Wang, Shanghai (CN); Jianming Xu, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/744,156

(22) PCT Filed: Jul. 20, 2015

(86) PCT No.: PCT/CN2015/084426
§ 371 (c)(1),
(2) Date: Jan. 12, 2018

(87) PCT Pub. No.: WO2017/011972
PCT Pub. Date: Jan. 26, 2017

(65) Prior Publication Data
US 2018/0194948 A1    Jul. 12, 2018

(51) Int. Cl.
| C09D 5/02 | (2006.01) |
| C08F 220/18 | (2006.01) |
| C08F 220/28 | (2006.01) |
| C09D 133/08 | (2006.01) |
| C08F 220/58 | (2006.01) |
| C09D 4/00 | (2006.01) |
| C09D 157/00 | (2006.01) |
| C08K 5/00 | (2006.01) |
| C08F 2/22 | (2006.01) |

(52) U.S. Cl.
CPC .......... *C09D 5/024* (2013.01); *C08F 220/18* (2013.01); *C08F 220/28* (2013.01); *C08F 220/58* (2013.01); *C08K 5/0025* (2013.01); *C09D 4/00* (2013.01); *C09D 133/08* (2013.01); *C08F 2/22* (2013.01); *C09D 157/00* (2013.01)

(58) Field of Classification Search
CPC combination set(s) only.
See application file for complete search history.

(56) References Cited

U.S. PATENT DOCUMENTS

| 2,480,810 | A | * | 8/1949 | Jones | C08F 18/12 525/376 |
| 4,296,226 | A | * | 10/1981 | Braun | C08F 246/00 524/558 |
| 4,421,889 | A | * | 12/1983 | Braun | C08F 212/06 524/357 |
| 5,227,423 | A | * | 7/1993 | Ingle | C08F 220/28 524/458 |
| 5,264,466 | A | * | 11/1993 | Takiyama | C09D 5/1668 523/122 |
| 5,962,556 | A | * | 10/1999 | Taylor | C08F 220/34 523/410 |
| 6,503,975 | B1 | | 1/2003 | Huybrechts | |
| 6,969,734 | B1 | * | 11/2005 | Pressley | C08K 5/521 427/420 |
| 7,855,261 | B2 | | 12/2010 | Kuo et al. | |
| 8,013,092 | B1 | * | 9/2011 | Krajnik | C09D 133/14 526/303.1 |
| 8,568,831 | B2 | * | 10/2013 | Wu | C08F 220/28 427/385.5 |
| 2003/0207121 | A1 | | 11/2003 | McGee | |
| 2006/0135684 | A1 | * | 6/2006 | Killilea | C08G 18/0823 524/556 |
| 2010/0081753 | A1 | | 4/2010 | Ma | |
| 2010/0093919 | A1 | * | 4/2010 | Uesugi | D06M 15/27 524/544 |
| 2010/0216363 | A1 | * | 8/2010 | Kubota | D06M 15/263 442/93 |
| 2012/0157609 | A1 | * | 6/2012 | Maddox | C07C 69/716 524/558 |

FOREIGN PATENT DOCUMENTS

| CN | 103555120 A | 2/2014 | |
| CN | 103965730 A | 8/2014 | |
| EP | 0501666 A1 * | 9/1992 | ............ C08F 220/28 |
| EP | 2412423 A1 | 2/2012 | |

(Continued)

OTHER PUBLICATIONS

International Search Report; International Application No. PCT/CN2015/084426; International Filing Date Jul. 20, 2015; dated Apr. 15, 2016; 3 pages.

(Continued)

Primary Examiner — Nicole M. Buie-Hatcher
(74) Attorney, Agent, or Firm — Karl E. Stauss; Cantor Colburn LLP

(57) ABSTRACT

The present invention provides a coating additive copolymer comprising, as copolymerized units, by dry weight based on total dry weight of the copolymer, from 20% to 60%, at least one acetoacetoxy or acetoacetamide functional ethylenically unsaturated monomer, and from 40% to 80% at least one water soluble ethylenically unsaturated monomer. It further provides a coating formulation comprising higher than 0.04% by dry weight based on total dry weight of the coating formulation, the acetoacetoxy or acetoacetamide functional ethylenically unsaturated monomer.

7 Claims, No Drawings

(56) References Cited

FOREIGN PATENT DOCUMENTS

| IN | 219364 | | 3/2005 | |
|----|--------|---|--------|---|
| JP | 2003213217 A | * | 7/2003 | |
| WO | 9927025 A1 | | 6/1999 | |
| WO | WO-2014190515 A1 | * | 12/2014 | ............ C08F 265/06 |

OTHER PUBLICATIONS

Written Opinion of the International Searching Authority; International Application No. PCT/CN2015/084426; International Filing Date Jul. 20, 2015; dated Apr. 15, 2016; 3 pages.

* cited by examiner

COATING ADDITIVE

FIELD OF THE INVENTION

The present invention provides a coating additive, and a coating formulation comprising the coating additive.

INTRODUCTION

Acetoacetoxy or acetoacetamide functional monomers such as acetoacetoxyethyl methacrylate (AAEM) is commonly used to make self-crosslinking, room-temperature-cure emulsion copolymers that may be used to produce coatings having good hardness and chemical and block resistance. Once incorporated into the copolymer, the acetoacetoxy-functionality of the AAEM monomer can cross-link via an "oxidative cure" or react with an added cross-linker such as a diamine to produce a cured film. Due to the similar chemistry, the acetoacetoxy functionality can also be employed to react with formaldehyde.

Due to technique limitations, AAEM was usually polymerized in coating binders to achieve its above roles. This limited AAEM's use.

It is therefore desired to provide a coating additive comprising acetoacetoxy or acetoacetamide functional monomers and can be added separately to the coating. It is surprising that acetoacetoxy functionality has a much higher effectiveness when it is added through coating additives rather than through coating binders.

SUMMARY OF THE INVENTION

The present invention provides a coating additive copolymer comprising, as copolymerized units, by dry weight based on total dry weight of the copolymer, from 20% to 60%, at least one acetoacetoxy or acetoacetamide functional ethylenically unsaturated monomer, and from 40% to 80% at least one polyethylene glycol modified ethylenically unsaturated monomer.

The present invention further provides a coating formulation comprising higher than 0.04% by dry weight based on total dry weight of the coating formulation, the acetoacetoxy or acetoacetamide functional ethylenically unsaturated monomer.

DETAILED DESCRIPTION OF THE INVENTION

The coating additive of the present invention is a copolymer comprising, as copolymerized units, by dry weight based on total dry weight of the copolymer, from 20% to 60%, preferably from 25% to 55%, and more preferably from 30% to 45%, at least one acetoacetoxy or acetoacetamide functional ethylenically unsaturated monomer, and from 40% to 80%, preferably from 45% to 75%, and more preferably from 55% to 70%, at least one water soluble ethylenically unsaturated monomer.

Acetoacetoxy or Acetoacetamide Functional Ethylenically Unsaturated Monomer

Acetoacetoxy or acetoacetamide functional ethylenically unsaturated monomers are monomers having at least one ethylenic unsaturation functional group and at least one acetoacetyl moiety attached to the ethylenic unsaturation functional group, and having the following structure:

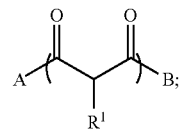

wherein $R^1$ is selected from H, alkyl having 1 to 10 carbon atoms, and phenyl;
wherein A has the following structure:

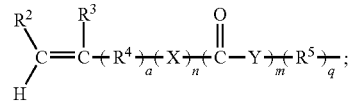

wherein $R^2$ is selected from H, alkyl having 1 to 10 carbon atoms, phenyl, halo, $CO_2CH_3$, and CN; $R^3$ is selected from H, alkyl having 1 to 10 carbon atoms, phenyl, and halo; $R^4$ is selected from alkylene having 1 to 10 carbon atoms and phenylene; and $R^5$ is selected from alkylene having 1 to 10 carbon atoms and phenylene;
wherein a, m, n, and q are independently selected from 0 and 1; and
wherein each of X and Y is selected from —NH— and —O—; and
wherein B is selected from A, alkyl having 1 to 10 carbon atoms, phenyl, and heterocyclic groups.

Suitable examples of the acetoacetoxy or acetoacetamide functional ethylenically unsaturated monomers include acetoacetoxyalkyl (meth)acrylate such as acetoacetoxyethyl (meth)acrylate, acetoacetoxypropyl (meth)acrylate, acetoacetoxybutyl (meth)acrylate, and 2,3-di(acetoacetoxy) propyl (meth)acrylate; allyl acetoacetate; vinyl acetoacetate; and acetoacetamide having the following structure:

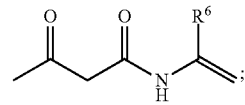

wherein $R^6$ is selected from H and methyl.

Preferably, the acetoacetoxy or acetoacetamide functional ethylenically unsaturated monomers are selected from acetoacetoxyethyl (meth)acrylate, acetoacetoxypropyl (meth)acrylate, acetoacetoxybutyl (meth)acrylate, allyl acetoacetate, 2,3-di(acetoacetoxy) propyl (meth)acrylate, and any combinations thereof.

Water Soluble Ethylenically Unsaturated Monomer

The water soluble ethylenically unsaturated monomers are monomers having the following structure:

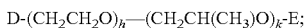

$$D\text{-}(CH_2CH_2O)_h\text{—}(CH_2CH(CH_3)O)_k\text{-}E;$$

wherein h is an integer of from 0 to 150, preferably from 23 to 100, and more preferably from 25 to 50; and k is an integer of from 0 to 30, preferably from 0 to 20, and more preferably from 0 to 10;
wherein D is an ethylenically unsaturated group, and is selected from methyacrylate ($CH_2$=$C(CH_3)CO_2$—), methacrylamide ($CH_2$=$C(CH_3)CONH$—), acrylate ($CH_2$=$CHCO_2$—), acrylamide ($CH_2$=$CHCONH$—), vinyl ether ($CH_2$=$CH$—$O$—), and allyl ether ($CH_2$=$CHCH_2$—$O$—); and wherein E is a capping group, and is selected from H, alkyl having 1 to 4 carbon atoms, and anionic salt groups including lithium, sodium, potassium and ammonium salt of phosphonate, phosphate, sulfate and sulfonate.

Suitable examples of the water soluble ethylenically unsaturated monomer include methoxy polyethylene glycol (meth)acrylate, polyethylene glycol (meth)acrylate, hydroxypropyl (meth)acrylate, vinylsulfonic acid sodium (SVS), sodium p-styrenesulfonate (SSS), acrylamide (AM), and N-hydroxylmethyl (meth)acrylate. Commercially available products include HOMASYTER™ MPEG-MA commercially available from Zhejiang Huangma chemical industry group Co., Ltd., and VISIOMER™ MPEG 1005 MA W, VISIOMER™ MPEG 2005 MA W, VISIOMER™ MPEG 5005 MA W commercially available from Evonik Industries AG.

Preferably, the water soluble ethylenically unsaturated monomers are selected from methoxypolyethylene glycol methacrylate, polyethylene glycol (meth)acrylate, and the combination thereof.

Polymerization Process

The emulsion or solution polymerization techniques used to prepare the copolymer are well known in the art. Conventional surfactants may be used as anionic and/or nonionic emulsifiers such as alkali metal or ammonium alkyl sulfates, alkyl sulfonic acids, fatty acids, and oxyethylated alkyl phenols. The amount of surfactant used is usually 0.1% to 6% by dry weight, based on the dry weight of total monomers. Either thermal or redox initiation processes may be used. Conventional free radical initiators may be used and suitable examples include hydrogen peroxide, t-butyl hydroperoxide, t-amyl hydroperoxide, ammonium, and alkali persulfates, in which the alkali include sodium and potassium, typically at a level of 0.01% to 3.0% by dry weight, based on the dry weight of total monomers. Redox systems using the same initiators coupled with a suitable reductant such as sodium hydrosulfite, isoascorbic acid, and sodium bisulfite may be used at similar levels, optionally in combination with metal ions such as iron and copper, optionally further including complexing agents for the metal. Chain transfer agents such as mercaptans may be used to adjust the molecular weight of the copolymers. The monomer mixture may be added neat or as an emulsion in water. The monomer mixture may be added in a single addition or in multiple additions or continuously over the reaction period using a uniform or varying composition. Additional ingredients such as free radical initiators, oxidants, reducing agents, chain transfer agents, neutralizers, surfactants, and dispersants may be added prior to, during, or subsequent to any of the stages.

Coating Formulation

The acetoacetoxy or acetoacetamide functional ethylenically unsaturated monomer may be added to the coating additive at a dry weight percentage of higher than 0.04%, preferably from 0.1% to 2%, and more preferably from 0.2% to 1.5%, based on total dry weight of the coating formulation.

EXAMPLES

I. Raw Materials

| Material | Company |
|---|---|
| HOMASYTER ™ MPEG-MA polyethylene glycol modified methacrylate | Zhejiang Huangma chemical industry group Co., Ltd. |
| acetoacetoxyethyl (meth)acrylate (AAEM) | Sinopharm Chemical Reagent Co., Ltd. |
| CELLOSIZE ™ QP-15000H thickener | The Dow Chemical Company |
| ECOSURF ™ BD-109 wetting agent | The Dow Chemical Company |
| propylene glycol | Sinopharm Chemical Reagent Co., Ltd. |
| AMP-95 base | The Dow Chemical Company |
| OROTAN ™ 1124 dispersant | The Dow Chemical Company |
| NOPCO NXZ defoamer | San Nopco Ltd. |
| TI-PURE ™ R-706 pigment | Du Pont Company |
| CC-700 extender | Guangfu Building Materials Group |
| ROCIMA ™ 342 preservative | The Dow Chemical Company |
| DB-80 extender | Shanxi Jinyang Calcined Kaolin Ltd. |
| ROPAQUE ™ Ultra E opaque polymer | The Dow Chemical Company |
| DISPONIL ™ FES 993 emulsifier | BASF Corporation |
| TEXANOL ™ coalescent | Eastman Chemical Company |
| KATHON ™ LX150 biocide | The Dow Chemical Company |
| ACRYSOL ™ RM-2020NMR thickener | The Dow Chemical Company |
| ACRYSOL ™ TT-935 thickener | The Dow Chemical Company |

II. Test Process

1. Formaldehyde (HCHO) Abatement Effectiveness Test

The coating formulation was drawn down on a black vinyl panel using a 200 nm film caster, and was air dried in the horizontal position for one day. The coating formulation was further drawn down on the back side of the panel using the 200 nm film caster, and was air dried in the horizontal position for 7 days. 5 cm×1 cm coating film samples were cut for the test.

The coating film samples were fixed with clips and put into well-sealed test bottles. Formaldehyde was injected into the test bottle via small hole through the bottle sap. In 24 hours at room temperature, a 3-methyl-2-benzothiazolinone hydrazone (MBTH) solution was injected into the test bottle to absorb formaldehyde residue. In another 2 hours, the formaldehyde content in the absorption solution was tested via spectrophotometer method. The less formaldehyde content remained in the solution, the higher formaldehyde abatement effectiveness of the coating film. The formaldehyde abatement effectiveness was expressed in percentage. The higher the percentage was, the higher the formaldehyde abatement effectiveness.

III. Experimental Examples

1. Preparation for the Coating Additives 1 to 2

A monomer mixture was prepared by mixing 370 g deionized water (DI), 80 g (99.0% active) acetoacetoxyethyl (meth)acrylate, and 162.8 g HOMASYTER™ MPEG-MA polyethylene glycol modified methacrylate.

1600 g deionized water was added to a 3-liter four-neck round-bottom flask equipped with a paddle stirrer, a thermometer, a nitrogen inlet, and a reflux condenser, and then heated to 78° C. under nitrogen atmosphere with stirring. 1.5 g ferrous sulfate in 10 g DI water was then added to the flask and the flask was then rinsed with 6 g DI water. 1.8 g sodium bisulfite in 8 g DI water was then added to the flask and the flask was then rinsed with 2 g DI water. After 5 min, the monomer mixture was fed into the flask during 60 min, co-fed with 1.4 g sodium persulfate in 72 g DI water and 26 g sodium bisulfite in 66 g DI water. The temperature was lowered to 66° C., and 1.06 g sodium persulfate in 10 g DI water was added and held for 15 min. Then the temperature was further cooled to 40° C., and then 15 g hydrogen peroxide (35% active) in 10 g DI water was added into the flask and held for 5 min. The flask was cooled down to room temperature and then 22 g ethanolamine (50% active) was added with efficient stirring. The prepared product is a copolymer dispersion of Coating Additive 1 having a 10.1% solid and a pH value of 3.54.

The copolymer dispersion of Coating Additive 2 was prepared according to the above procedure with only the monomer mixture changed to 370 g deionized water (DI), 40 g (99.0% active) acetoacetoxyethyl (meth)acrylate, and 217.5 g HOMASYTER™ MPEG-MA polyethylene glycol modified methacrylate. The prepared copolymer dispersion of Coating Additive 2 had a 9.58% solid and a pH value of 3.89.

2. Preparation for the Binders 1 to 3 Binder 1 was prepared from a monomer mixture that contained 501.7 g DI water, 23.94 g sodium dodecyl benzene sulfonate (DS-4, 22.5% active), 747 g butyl acrylate, 652.9 g methyl methacrylate, 22.41 g methacrylic acid, and 74.7 g acetoacetoxyethyl methacrylate. 47.2 g of the monomer mixture was added to a kettle containing a mixture of 1317.9 g DI water and 10.64 g DS-4 (22.5% active) and was heated to 85° C. 2.26 g sodium persulfate (SPS) dissolved in 50 g DI water was then added as an initiator. Ten minutes later, the remainder of the monomer mixture was gradually added over 90 min along with 1.13 g SPS dissolved in 50 g DI water in a separate feed to the kettle. After the completion of the feeding, mixture in the kettle was cooled to 60° C. and chased by adding 0.75 g of t-butyl hydroperoxide dissolved in 12.5 g DI water followed by 0.45 g isoascorbic acid (IAA) dissolved in 12.5 g DI water over 30 min. The mixture was then cooled to room temperature and ammonium hydroxide was added to adjust the pH value to about 9.0.

Binder 2 was prepared according to the above procedure with only the monomer mixture changed to 501.7 g DI water, 23.94 g sodium dodecyl benzene sulfonate (DS-4, 22.5% active), 747 g butyl acrylate, 725.2 g methyl methacrylate, 22.41 g methacrylic acid, and 2.39 g acetoacetoxyethyl methacrylate.

Binder 3 was prepared according to the above procedure with only the monomer mixture changed to 501.7 g DI water, 23.94 g sodium dodecyl benzene sulfonate (DS-4, 22.5% active), 747 g butyl acrylate, 727.6 g methyl methacrylate, and 22.41 g methacrylic acid.

3. Preparation for the Coating Formulations 1 to 10

Coating formulations 1 to 10 were prepared according to the procedure of Table 1 with detailed differences shown in Table 2.

TABLE 1

| Coating formulation | |
|---|---|
| Grind | |
| water | 130.00 |
| CELLOSIZE QP-15000H thickener | 2.00 |
| AMP-95 base | 2.00 |
| propylene glycol | 10.00 |
| ECOSURF BD-109 wetting agent | 2.00 |
| NOPCO NXZ defoamer | 2.00 |
| OROTAN 1124 dispersant | 6.00 |
| TI-PURE R-706 pigment | 200.00 |
| CC-700 extender | 120.00 |
| DB-80 extender | 60.00 |
| ROCIMA 342 preservative | 2.00 |
| Sub totals | 536.00 |

TABLE 1-continued

| Coating formulation | |
|---|---|
| Let-down | |
| Water | 90.00 |
| Binder 1, 2 or 3 | 300.00 |
| TEXANOL coalescent | 8.00 |
| ROPAQUE Ultra E opaque polymer | 40.00 |
| NOPCO NXZ defoamer | 1.00 |
| KATHON LX150 biocide | 1.00 |
| ACRYSOL RM-2020NMR thickener | 12.00 |
| ACRYSOL TT-935 thickener | 350 |
| Water | 10.00 |
| Total | 1001.50 |

IV. Results

TABLE 2

| Coatings | Binders | Additives | AAEM in Coating (%) | formaldehyde abatement effectiveness |
|---|---|---|---|---|
| Comp. 1* | 1 (5% AAEM) | — | 1.38% | 85.47% |
| 2 | 3 (0% AAEM) | 1 (40% AAEM) | 0.69% | 90.34% |
| 3 | 3 (0% AAEM) | 1 (40% AAEM) | 0.35% | 90.35% |
| 4 | 3 (0% AAEM) | 1 (40% AAEM) | 0.17% | 83.84% |
| 5 | 3 (0% AAEM) | 1 (40% AAEM) | 0.04% | 77.34% |
| Comp. 6* | 3 (0% AAEM) | 1 (40% AAEM) | 0.02% | 65.95% |
| Comp. 7* | 2 (0.16% AAEM) | — | 0.04% | 62.16% |
| 8 | 3 (0% AAEM) | 2 (20% AAEM) | 0.04% | 76.77% |
| Comp. 9* | 3 (0% AAEM) | 2 (20% AAEM) | 0.02% | 62.80% |

*Coatings 1, 6, 7, and 9 are Comparative Coating Formulations.

Binder 1 contained 5% AAEM, while Binder 3 contained no AAEM. Inventive Coatings 2 to 5 comprised Binder 3 and therefore comprised no AAEM in the binder compositions, but they comprised different AAEM loadings in the additives. Comparative Coating 1 comprised Binder 1 and therefore comprised AAEM in the binder composition, but it did not comprise any AAEM in the additive. The total AAEM loadings in the Inventive Coatings 2 to 5 were much lower than that in Comparative Coating 1. To achieve similar formaldehyde abatement effectiveness, AAEM loadings in the Coatings could be significantly less if AAEM was added in the additive rather than in the binder composition. Specifically, Comparative Coating 1 had the similar formaldehyde abatement effectiveness as Inventive Coating 4, and the AAEM loading in Comparative Coating 1 was 1.38%, while the AAEM loading in Inventive Coating 4 was only 0.17% by dry weight based on total dry weight of the coating composition.

Comparative Coatings 7 and 9, and Inventive Coating 8 Also Proved the Same Trend.

Binder 2 contained 0.16% AAEM. Inventive Coating 8 and Comparative Coating 9 comprised Binder 3 and therefore comprised no AAEM in the binder compositions, but they comprised different AAEM loadings in the additives. Comparative Coating 7 comprised Binder 2 and therefore comprised AAEM in the binder composition, but it did not comprise any AAEM in the additive. Inventive Coating 8 and Comparative Coating 7 comprised equal amount of AAEM, the only difference was that AAEM was added in the binder in Comparative Coating 7, while added in the additive in Inventive Coating 8. Inventive Coating 8 had a significantly better formaldehyde abatement effectiveness compared to that of Comparative Coating 7. It again proved that to achieve similar formaldehyde abatement effectiveness, AAEM loading in the Coatings could be significantly less if AAEM was added in the additive rather than in the binder composition. Specifically, Comparative Coating 7 had the similar formaldehyde abatement effectiveness as Comparative Coating 9, and the AAEM loading in Comparative Coating 7 was 0.04%, while the AAEM loading in Comparative Coating 9 was only 0.02% by dry weight based on total dry weight of the coating composition.

In another aspect, AAEM loadings in the coating formulation limited coatings' formaldehyde abatement effectiveness, and would work only at a range of higher than 0.04% by dry weight based on total dry weight of the coating composition.

What is claimed is:

1. A coating formulation comprising a coating additive copolymer comprising, as copolymerized units, by dry weight based on total dry weight of the copolymer,
   from 20% to 60%, at least one acetoacetoxy or acetoacetamide functional ethylenically unsaturated monomer, and
   from 40% to 80% at least one water soluble ethylenically unsaturated monomer having the following structure:

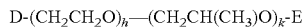

wherein h is an integer of from 0 to 150; and k is an integer of from 0 to 30;
   wherein D is an ethylenically unsaturated group comprising methacrylate ($CH_2$=C($CH_3$)$CO_2$—), methacrylamide ($CH_2$=C($CH_3$)CONH—), acrylate ($CH_2$=$CHCO_2$—), acrylamide ($CH_2$=CHCONH—), vinyl ether ($CH_2$=CH—O—), or allyl ether ($CH_2$=$CHCH_2$—O—); and
   wherein E is a capping group, and is selected from H, alkyl having 1 to 4 carbon atoms, and anionic salt groups comprising a lithium, sodium, potassium, or ammonium salt of phosphonate, phosphate, sulfate, or sulfonate;
   sodium vinylsulfonate; or sodium p-styrenesulfonate;
   wherein the coating formulation comprises, as copolymerized units, from 0.1% to 2% by dry weight based on total dry weight of the coating formulation, of the acetoacetoxy or acetoacetamide functional ethylenically unsaturated monomer.

2. The coating formulation according to claim 1 wherein the coating additive copolymer comprises, as (co)polymerized units, by dry weight based on total dry weight of the copolymer, from 30% to 45%, at least one acetoacetoxy or acetoacetamide functional ethylenically unsaturated monomer.

3. The coating formulation according to claim 1 wherein the coating additive copolymer comprises, as copolymerized units, by dry weight based on total dry weight of the copolymer, from 55% to 70% at least one water soluble ethylenically unsaturated monomer.

4. The coating formulation according to claim 1 wherein the acetoacetoxy or acetoacetamide functional ethylenically unsaturated monomers have the following structure:

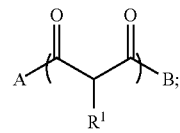

wherein $R^1$ is selected from H, alkyl having 1 to 10 carbon atoms, and phenyl;
wherein A has the following structure:

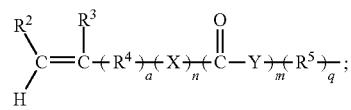

wherein $R^2$ is selected from H, alkyl having 1 to 10 carbon atoms, phenyl, halo, —$CO_2CH_3$, and —CN; $R^3$ is selected from H, alkyl having 1 to 10 carbon atoms, phenyl, and halo; $R^4$ is selected from alkylene having 1 to 10 carbon atoms and phenylene; and R5 is selected from alkylene having 1 to 10 carbon atoms and phenylene;
wherein a, m, n, and q are independently selected from 0 and 1; and
wherein each of X and Y is selected from —NH— and —O—; and
wherein B is selected from A, alkyl having 1 to 10 carbon atoms, phenyl, and heterocyclic groups.

5. The coating formulation according to claim 4 wherein the acetoacetoxy and acetoacetamide functional ethylenically unsaturated monomers are selected from acetoacetoxyethyl (meth)acrylate, acetoacetoxypropyl (meth)acrylate, acetoacetoxybutyl (meth)acrylate, allyl acetoacetate, 2,3-di(acetoacetoxy) propyl (meth)acrylate, and any combinations thereof.

6. The coating formulation according to claim 1 wherein the water soluble ethylenically unsaturated monomers are selected from methoxypolyethylene glycol (meth)acrylate, polyethylene glycol (meth)acrylate, hydroxypropyl (meth)acrylate, and N-hydroxylmethyl (meth)acrylate.

7. The coating formulation according to claim 1 wherein it comprises, as copolymerized units, from 0.2% to 1.5% by dry weight based on total dry weight of the coating formulation, of the acetoacetoxy or acetoacetamide functional ethylenically unsaturated monomer.

* * * * *